April 11, 1944.   M. J. MITCHELL   2,346,319
RESILIENT WHEEL MOUNTING
Filed Dec. 26, 1942
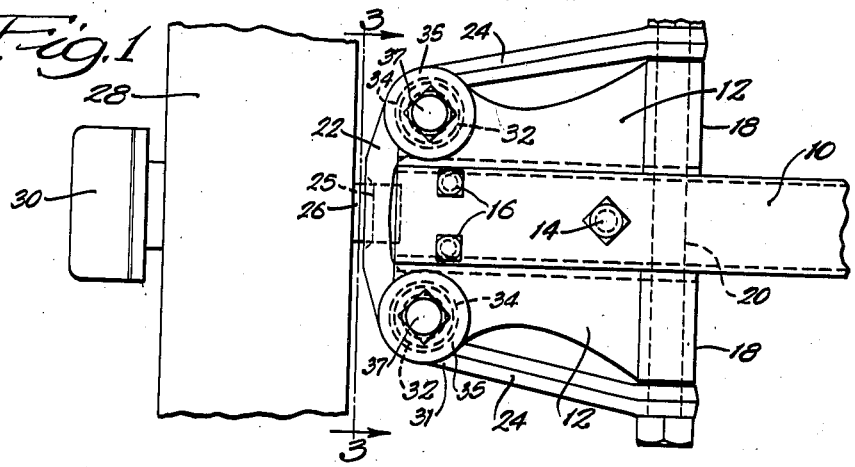
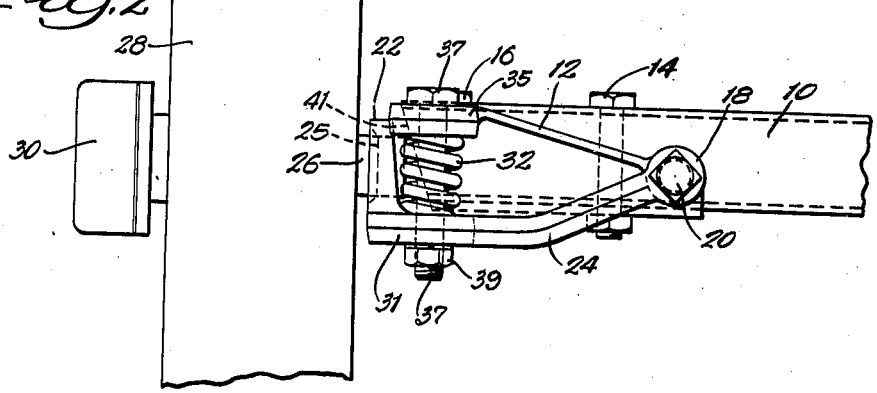
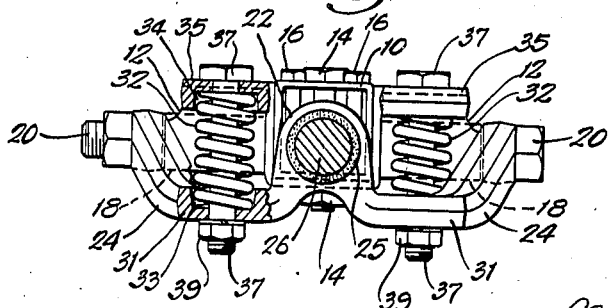
Inventor.
Melville J. Mitchell,
By Paul O. Pippel
Attorney.

Patented Apr. 11, 1944

2,346,319

UNITED STATES PATENT OFFICE 2,346,319

RESILIENT WHEEL MOUNTING

Melville J. Mitchell, Highland Park, Ill., assignor to International Harvester Company, a corporation of New Jersey Application December 26, 1942, Serial No. 470,134

2 Claims. (Cl. 301—133)

This invention relates to a new and novel resilient wheel mounting and has for one of its principal objects the provision of an individual spring wheel mounting especially adapted for agricultural implements.

The modern agricultural devices have been designed for use with pneumatic tires and, therefore, require a certain amount of resiliency in order to adequately protect the machinery against the jarring and jolting it receives when operating over rough terrain. The present rubber shortage has necessitated the substitution of steel or other similar rigid wheels for the rubber pneumatic type now employed. The requirement of a resilient mounting for the substituted rigid wheels is, therefore, essential for the proper operation of the implement.

An important object of this invention is to provide a resilient mounting for vehicle wheels, which utilizes a yoke, wishbone, or bifurcated construction for suspending the wheel on a pair of helical springs.

Another important object of this invention is the provision of a spring mounting for vehicle wheels which allows for variable hinged compression of the individual wheels, depending upon the requirements due to existing road or field conditions over which the vehicle is operating.

Other and further important objects will become apparent from the disclosures in the following specification and accompanying drawing, in which:

Figure 1 is a top plan view of the resilient wheel mounting of this invention;

Figure 2 is a side elevational view of the device as shown in Figure 1; and

Figure 3 is a sectional view taken on the line 3—3 of Figure 1.

The reference numeral 10 indicates generally a wheel-supporting shaft, such as accompanies agricultural implements. The shaft 10 in the present instance is shown as a square, tubular member, but this may be any type of shaft as desired, and is readily adaptable to the receiving of the resilient wheel mounting of this invention. A plate-like member 12 is rigidly affixed to the supporting shaft 10 by means of bolts, a single one at 14 and a pair, as shown at 16. The plate member 12 is so bent as to conform closely to the square shape of the under side of the tubular shaft 10 and has portions projecting beyond the side limits of the shaft 10 which form the upper supports for the springs 32 employed in this resilient wheel mounting. The rearward portions of the side projections of the plate member 12 are rolled in the form of cylinders 18, which act as bearing supports for a hinge pin 20.

A yoke or bifurcated member 22 has rearwardly extending arms 24 which terminate at a point adjacent the cylindrical portions 18 of the plate member 12 and have apertures therethrough for the purpose of being hinged to the plate member 12 by the hinge pin 20. The apex or juncture portion of the arms 24 of the yoke member 22 has welded thereto, at 25, an axle 26. A vehicle wheel 28 is mounted upon the axle 26 and is held thereon by a hub 30. The forward ends 31 of the arms 24 of the bifurcated member 22 support a pair of springs 32 within recesses 33. The upper ends of the springs 32 are received in recessed sockets 34 in the forward ends 35 of the plate member 12. Guide bolts 37 pass centrally of the springs 32, through the portions 31 of the yoke member 22, and through the portions 35 of the plate member 12. The bolts 37 and nuts 39 are employed to load the springs to some predetermined initial compression.

In operation, the vehicle wheel 28, upon striking rough ground, will simulate the action of a pneumatic tired wheel by means of the springs 32 being mounted intermediate the wishbone member 22 and the plate member 12, which is an integral part of the supporting shaft 10. The yoke member 22 pivots about the hinge pin 20 and, in so doing, compresses the springs 32, thereby taking up the shock of the bumps over which the vehicle is run. The end of the square tubular supporting shaft 10 is cut off on an incline, as shown at 41, in order to allow full compression of the springs 32 without having the yoke member interfere with the supporting shaft.

It will be seen that herein is provided a novel type of resilient wheel mounting and one which is conducive to relieving the stresses and strains on the intricate machinery ordinarily supplied on agricultural implements such as harvester threshers. It is obvious that the resilient wheel mounting of this invention is not necessarily limited to use on agricultural implements but may be employed to advantage on any vehicle whether it be automotive or merely a drawn type.

I am aware that numerous details of the construction may be varied throughout a wide range without departing from the principles disclosed herein and I, therefore, do not propose limiting the patent granted hereon otherwise than as necessitated by the appended claims.

What is claimed is:

1. An individual wheel suspension for vehicles comprising a supporting shaft, a bifurcated member having arms with apertures in the ends thereof, a plate-like member rigidly affixed to said supporting shaft, the said plate-like member having extensions laterally of said supporting shaft, the rearward portions of the extensions of said plate forming tubular bearing members at right angles to said supporting shaft, a pin hinging the bifurcated member to the tubular bearing members of the plate-like member and the supporting shaft, a pair of springs mounted upon the bifurcated member at the forward ends of the arms and beneath the forward portions of the extensions of the plate-like member, an axle rigidly affixed to the bifurcated member at the juncture of the arms thereof, and a wheel mounted on said axle, whereby said wheel moves with said bifurcated member which is resiliently hinged with respect to said supporting shaft.

2. An individual spring wheel suspension for vehicles comprising a supporting shaft, a bifurcated member having rearwardly extending arms with apertures in the ends thereof, a plate-like member rigidly affixed to said supporting shaft, the said plate-like member having extensions beyond the side limits of said supporting shaft, the rearward portions of the said extensions of said plate-like member being rolled to form cylinders at right angles to said supporting shaft, a hinged pin extending through the bifurcated arm apertures, the plate-like member cylinders and the supporting shaft, a pair of springs mounted upon the bifurcated member at the forward ends of the arms and beneath the side extensions of the forward end of the plate-like member, an axle rigidly affixed to the apex of the bifurcated member, and a wheel mounted on said axle, whereby said wheel moves with said bifurcated member which is resiliently hinged with respect to said supporting shaft.

MELVILLE J. MITCHELL.